United States Patent
Shin et al.

(10) Patent No.: US 10,414,218 B2
(45) Date of Patent: Sep. 17, 2019

(54) APPARATUS AND METHOD FOR MONITORING TIRE PRESSURE USING RADIUS ANALYSIS

(71) Applicant: HYUNDAI AUTRON CO., LTD., Seongnam-si (KR)

(72) Inventors: Seung-Hwan Shin, Gwangmyeong-si (KR); Tae-Rim Choi, Yongin-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 65 days.

(21) Appl. No.: 15/209,440

(22) Filed: Jul. 13, 2016

(65) Prior Publication Data
US 2017/0015153 A1 Jan. 19, 2017

(30) Foreign Application Priority Data
Jul. 13, 2015 (KR) .................. 10-2015-0099112

(51) Int. Cl.
*B60C 23/06* (2006.01)
*G01M 17/02* (2006.01)

(52) U.S. Cl.
CPC .......... *B60C 23/061* (2013.01); *G01M 17/02* (2013.01)

(58) Field of Classification Search
CPC .............................. B60C 23/061; G01M 17/02
See application file for complete search history.

(56) References Cited

U.S. PATENT DOCUMENTS

| 2005/0087008 A1* | 4/2005 | Yanase | B60C 23/061 73/146 |
| 2006/0076095 A1* | 4/2006 | Oshiro | B60C 23/003 152/154.1 |
| 2007/0139179 A1* | 6/2007 | Yanase | B60C 23/061 340/443 |
| 2009/0063031 A1* | 3/2009 | Greiner | G06Q 10/08 701/117 |
| 2009/0066497 A1* | 3/2009 | Christenson | B60C 23/0416 340/442 |
| 2010/0164704 A1* | 7/2010 | Lindskog | B60C 23/062 340/442 |
| 2010/0179718 A1* | 7/2010 | Kobe | B60C 23/061 701/31.4 |

(Continued)

*Primary Examiner* — Mohammad K Islam
(74) *Attorney, Agent, or Firm* — Baker & Hostetler LLP; Hyunho Park

(57) ABSTRACT

The present invention relates to an apparatus for monitoring a tire pressure. Provided is a tire pressure monitoring apparatus including: a radius analyzing unit which calculates a radius analysis value using a relative speed difference and an average speed calculated from wheel speeds of the wheels mounted on the vehicle; a regression equation calculating unit which calculates a first regression equation for the calculated radius analysis value and first driving information and a second regression equation for the calculated radius analysis value and second driving information; a mass calculating unit which calculates an additional mass of the vehicle; a calibration unit which corrects the calculated radius analysis value using a combination of the calculated first and second regression equations and the calculated additional mass; and a low pressure determining unit which determines a low pressure of a tire mounted on the vehicle using the corrected radius analysis value.

14 Claims, 5 Drawing Sheets

(56) References Cited

U.S. PATENT DOCUMENTS

| | | | |
|---|---|---|---|
| 2010/0182142 A1* | 7/2010 | Svedberg | B60C 23/061 340/442 |
| 2010/0204869 A1* | 8/2010 | Hall | B60C 23/061 701/31.4 |
| 2010/0318308 A1* | 12/2010 | Gustavsson | B60C 23/061 702/98 |
| 2010/0318333 A1* | 12/2010 | Hall | G06F 11/008 703/6 |
| 2011/0098882 A1* | 4/2011 | Sugisawa | G01L 17/00 701/33.4 |
| 2011/0190975 A1* | 8/2011 | Hourlier | B60C 23/061 701/31.4 |
| 2011/0210841 A1* | 9/2011 | Wang | B60C 23/061 340/443 |
| 2011/0231051 A1* | 9/2011 | Gerdin | B60C 23/061 701/31.4 |
| 2012/0116607 A1* | 5/2012 | Guinart | B60C 23/0416 701/1 |
| 2012/0245787 A1* | 9/2012 | Kawasaki | B60C 23/062 701/29.1 |
| 2013/0158809 A1* | 6/2013 | Yopp | B60R 21/0134 701/45 |
| 2015/0377740 A1* | 12/2015 | Park | G01M 17/02 702/33 |
| 2016/0131547 A1* | 5/2016 | Yanase | B60C 23/061 702/50 |
| 2017/0361707 A1* | 12/2017 | Flog Rd | B60C 23/061 |

* cited by examiner

APPARATUS AND METHOD FOR MONITORING TIRE PRESSURE USING RADIUS ANALYSIS

CROSS-REFERENCE TO RELATED APPLICATIONS

This application claims priority to and the benefit of Korean Patent Application No. 10-2015-0099112 filed in the Korean Intellectual Property Office on Jul. 13, 2015, the entire contents of which are incorporated herein by reference.

TECHNICAL FIELD

The present invention relates to an apparatus and a method for monitoring a tire pressure, and more particularly, to an apparatus and a method for monitoring a tire pressure which calculates a regression equation on radius analysis and driving information of a vehicle to correct a radius analysis value, thereby precisely determining a low pressure of a tire mounted on a vehicle in accordance with a corrected radius analysis value.

BACKGROUND ART

Air pressure of a tire is one of the elements that allow a vehicle to safely travel. When the air pressure of the tire is low, a vehicle easily slides, and as a result, there is a possibility that the life-span of the tire is shortened and ride comfort and braking force significantly deteriorate. When the air pressure of the tire decreases, functional problems including deterioration of fuel efficiency, tire wear, and the like may occur. In addition, when the decrease in air pressure is significant, there is a possibility that vehicle damage and danger to human life such as an accident occurrence caused by a driving inoperability state or tire rupture will occur.

However, since most drivers cannot recognize a change in air pressure of the tire, a tire pressure monitoring system (TPMS) which is a tire pressure monitoring system announcing the change in pressure of the tire to the drivers in real time has been developed.

In recent years, the tire pressure monitoring system (TPMS) is mounted on a vehicle, which detects the decrease in air pressure of the tire mounted on the vehicle and announces the detected decrease in air pressure to the driver.

The tire pressure monitoring system (TPMS) announces the decrease in pressure of the tire to the driver to allow the driver to check a pressure state of the tire, thereby solving the problem.

The TPMS may be generally classified into a direct scheme and an indirect scheme.

The direct scheme of TPMS installs a pressure sensor in a tire wheel to directly measure the air pressure of the tire. The direct scheme of TPMS announces the change in air pressure of the tire, which is measured from the pressure sensor attached to the tire to the driver.

The direct scheme of TPMS may accurately sense the air pressure of the tire, but the life-span of a battery is limited and whenever the tire is replaced, the direct scheme of TPMS needs to be installed again. In the direct scheme of TPMS, since a pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of TPMS is a scheme that estimates a loss in air pressure by using a wheel speed sensor which is mounted on the vehicle to measure a wheel speed. In the indirect scheme of TPMS, since the TPMS may be implemented only by an algorithm, additional hardware is not required, which results in a reduced cost. Further, just a little maintenance cost is consumed. The indirect scheme of TPMS has better price competitiveness than the indirect scheme of TPMS.

The indirect scheme of TPMS indirectly estimates the change in air pressure of the tire through a change of a response characteristic (for example, a rotational velocity or a frequency characteristic of the rotational speed) of the tire, which is generated when the air pressure decreases and announces the indirectly estimated change to the driver. Even though the direct scheme of TPMS may accurately detect the lowering of the air pressure of the tire, a dedicated wheel is required and there may be a problem in the performance in an actual environment. Therefore, the direct scheme of TPMS has technical and costly problems.

Since the resonance frequency of the indirect scheme of TPMS varies depending on the wheel speed, accuracy of the indirect scheme of TPMS slightly deteriorates. Since the estimated change in air pressure of the tire may be different from an actual change, the indirect scheme of TPMS may send a false alarm to the driver.

The indirect scheme of TPMS is a method that estimates the air pressure of the tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme.

In a frequency analysis scheme, when the air pressure of the tire decreases, a difference from a tire having a normal air pressure is detected by using when a frequency characteristic of a rotational velocity signal of a wheel is changed. In the frequency analysis scheme, based on a resonance frequency which may be acquired by frequency analysis of the rotational velocity signal of the wheel, when the relevant resonance frequency is calculated to be lower than a reference frequency estimated while initialization, it is determined that the air pressure of the tire decreases.

In a radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the tire pressure monitoring system, since it is determined whether the tire is depressurized based on a wheel velocity, the wheel velocity exerts a largest influence on the determination of the depressurization.

The direct scheme of TPMS may accurately sense the air pressure of the tire, but the life-span of a battery is limited and whenever the tire is replaced, the direct scheme of TPMS needs to be installed again. In the direct scheme of TPMS, since a pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of TPMS is a scheme that estimates a loss in air pressure by using a wheel speed sensor which is mounted on the vehicle to measure a wheel speed. In the indirect scheme of TPMS, since the TPMS may be implemented only by an algorithm, additional hardware is not required, which results in a reduced cost. Further, just a little maintenance cost is consumed. The indirect scheme of TPMS has better price competitiveness than the indirect scheme of TPMS. However, since the resonance frequency of the indirect scheme of TPMS varies depending on the wheel speed, accuracy of the indirect scheme of TPMS slightly deteriorates. Since the estimated change in air pressure of the tire may be different from an actual change, the indirect scheme of TPMS may send a false alarm to the driver.

The indirect scheme of TPMS is a method that estimates the air pressure of the tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme.

In a frequency analysis scheme, when the air pressure of the tire decreases, a difference from a tire having a normal air pressure is detected by using that a frequency characteristic of a rotational velocity signal of a wheel is changed. In the frequency analysis scheme, based on a resonance frequency which may be acquired by frequency analysis of the rotational velocity signal of the wheel, when the relevant resonance frequency is calculated to be lower than a reference frequency estimated while initialization, it is determined that the air pressure of the tire decreases.

In a radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the TPMS, since it is determined whether the tire is depressurized based on a wheel velocity, the wheel velocity exerts a largest influence on the determination of the depressurization.

When the low pressure of the tire is estimated using a dynamic radius analysis technique, in the tire pressure monitoring system using radius analysis, a value estimated using the dynamic radius analysis technique may be affected by a driving situation. Since the estimated change in air pressure of the tire may be different from an actual change, the indirect scheme of TPMS may send a false alarm to the driver.

Therefore, a technique which more precisely monitors the pressure of the tire by correcting a dynamic radius analysis value in accordance with the driving situation is required.

SUMMARY OF THE INVENTION

The present invention has been made in an effort to provide an apparatus and a method for monitoring a tire pressure which calculates a regression equation on radius analysis to correct a radius analysis value and determine a low pressure of a tire mounted on a vehicle in accordance with a corrected radius analysis value.

The present invention has also been made in an effort to provide an apparatus and a method for monitoring a tire pressure using radius analysis which may increase reliability of executing a logic by stopping executing a calibration logic and executing a low pressure determination logic on a road surface which is irregular more than a reference.

A first aspect of the present invention provides a tire pressure monitoring apparatus using radius analysis. The apparatus includes a radius analyzing unit which calculates a radius analysis value using a relative speed difference and an average speed calculated from wheel speeds of the wheels mounted on the vehicle; a regression equation calculating unit which calculates a first regression equation for the calculated radius analysis value and first driving information and a second regression equation for the calculated radius analysis value and second driving information; a mass calculating unit which calculates an additional mass of the vehicle; a calibration unit which corrects the calculated radius analysis value using a combination of the calculated first and second regression equations and the calculated additional mass; and a low pressure determining unit which determines a low pressure of a tire mounted on the vehicle using the corrected radius analysis value.

The apparatus may further include a data storing unit which stores data for determining the low pressure of the tire mounted on the vehicle, stores data for calculating the first regression equation for the radius analysis value and the torque, and stores data for calculating the second regression equation for the radius analysis value and the yaw rate.

The data storing unit may include torque and yaw rate input buffers which are divided by predetermined sections and in which a torque value and a yaw rate value having a minimum value and a maximum value of a torque and a yaw rate are divided by a predetermined section input.

The regression equation calculating unit may calculate a first regression equation for a front and rear radius analysis value DEL_FR and a torque, when a torque value is counted in the data storing unit whenever the torque value is sampled in the torque input buffer to be input and the count value for every section of the torque input buffer is equal to or larger than a predetermined value.

The regression equation calculating unit may calculate a second regression equation for a left and right radius analysis value DEL_LR and a yaw rate, when a yaw rate value is counted in the data storing unit whenever the yaw rate value is sampled in the yaw rate input buffer to be input and the count value for every section of the yaw rate input buffer is equal to or larger than a predetermined value.

The regression equation calculating unit may calculate a first regression equation for the calculated front and rear radius analysis value DEL_FR and a torque and a second regression equation for the calculated left and right radius analysis value DEL_LR and a yaw rate.

The calibration unit may calculate a torque compensation value of a front and rear radius analysis value DEL_FR using a coefficient of the calculated first regression equation and a torque value, calculates a mass compensation value of the front and rear radius analysis value DEL_FR using an added mass of the vehicle, and calculates a DEL_FR corrected value by subtracting the calculated torque compensation value of the front and rear radius analysis value DEL_FR and the calculated mass compensation value of the front and rear radius analysis value DEL_FR from the calculated front and rear radius analysis value DEL_FR.

The calibration unit may calculate a yaw rate compensation value of the left and right radius analysis value DEL_LR using a coefficient of the second regression equation and the yaw rate and calculates a DEL_LR corrected value by subtracting the calculated yaw rate compensation value of the left and right radius analysis value DEL_LR from the calculated left and right radius analysis value DEL_LR.

The low pressure determining unit may determine a low pressure of a tire using the front and rear radius analysis values DEL_FR and DEL_LR corrected in accordance with at least one combination of coefficients, the torque, and the yaw rate of the calculated first and second regression equations.

Another aspect of the present invention further provides a tire pressure monitoring method using radius analysis. The method includes: calculating a radius analysis value using a relative speed difference and an average speed calculated from wheel speeds of the wheels mounted on the vehicle; calculating a first regression equation for the calculated radius analysis value and first driving information and a second regression equation for the calculated radius analysis value and second driving information; calculating an additional mass of the vehicle; correcting the calculated radius analysis value using a combination of the calculated first and second regression equations and the calculated additional mass; and determining a low pressure of a tire mounted on a vehicle using the corrected radius analysis value.

The method may further include storing data for determining the low pressure of the tire mounted on the vehicle, storing data for calculating the first regression equation for the radius analysis value and the torque, and storing data for calculating the second regression equation for the radius analysis value and the yaw rate.

In the storing of data, a torque value and a yaw rate value having a minimum value and a maximum value of a torque and a yaw rate may be input in torque and yaw rate input buffers which are divided by a predetermined section.

In the calculating of a regression equation, the torque value may be counted whenever the torque value is sampled in the torque input buffer to be input and when the count value for every section of the torque input buffer is equal to or larger than a predetermined value, a first regression equation for the front and rear radius analysis value DEL-FR and a torque may be calculated.

In the calculating of a regression equation, the yaw rate value may be counted whenever the yaw rate value is sampled in the yaw rate input buffer to be input and when the count value for every section of the yaw input buffer is equal to or larger than the predetermined value, a second regression equation for the left and right radius analysis value DEL_LR and the yaw rate may be calculated.

In the calculating of a regression equation, a first regression equation for the calculated front and rear radius analysis value DEL_FR and the torque may be calculated and a second regression equation for the calculated left and right radius analysis value DEL_LR and the yaw rate may be calculated.

In the correcting of a radius analysis value, a torque compensation value of a front and rear radius analysis value DEL_FR may be calculated using a coefficient of the calculated first regression equation and a torque value, a mass compensation value of the front and rear radius analysis value DEL_FR may be calculated using an added mass of the vehicle, and a DEL_FR corrected value may be calculated by subtracting the calculated torque compensation value of the front and rear radius analysis value DEL_FR and the calculated mass compensation value of the front and rear radius analysis value DEL_FR from the calculated front and rear radius analysis value DEL_FR.

In the correcting of a radius analysis value, a yaw rate compensation value of the left and right radius analysis value DEL_LR may be calculated using a coefficient of the second regression equation and the yaw rate and a DEL_LR corrected value may be calculated by subtracting the calculated yaw rate compensation value of the left and right radius analysis value DEL_LR from the calculated left and right radius analysis value DEL_LR.

In the determining of a low pressure, a low pressure of a tire may be determined using the corrected front and rear radius analysis values DEL_FR and left and right radius analysis values DEL_LR among radius analysis values.

According to the exemplary embodiments of the present invention, a regression equation on radius analysis is calculated to correct a radius analysis value and a low pressure of a tire mounted on a vehicle is determined using the corrected radius analysis value.

According to the exemplary embodiments of the present invention, when calibration for dynamic radius analysis is performed, a dynamic radius analysis value may be precisely corrected by considering an affect by a driving situation (for example, a torque or yaw rate).

According to the exemplary embodiment of the present invention, a reliability of calculating a first regression equation of a front and rear radius analysis value DEL_FR and a torque and a second regression equation of a left and right radius analysis value DEL_LR and a yaw rate may be easily verified using a torque input buffer and a yaw rate input buffer.

According to the exemplary embodiment of the present invention, a first regression equation of a front and rear radius analysis value DEL_FR and a torque and a second regression equation of a left and right radius analysis value DEL_LR and a yaw rate are calculated using a torque value and a yaw rate value whose reliability is verified and the calculated first and second regression equations are used to more precisely determine a low pressure of a tire mounted on the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
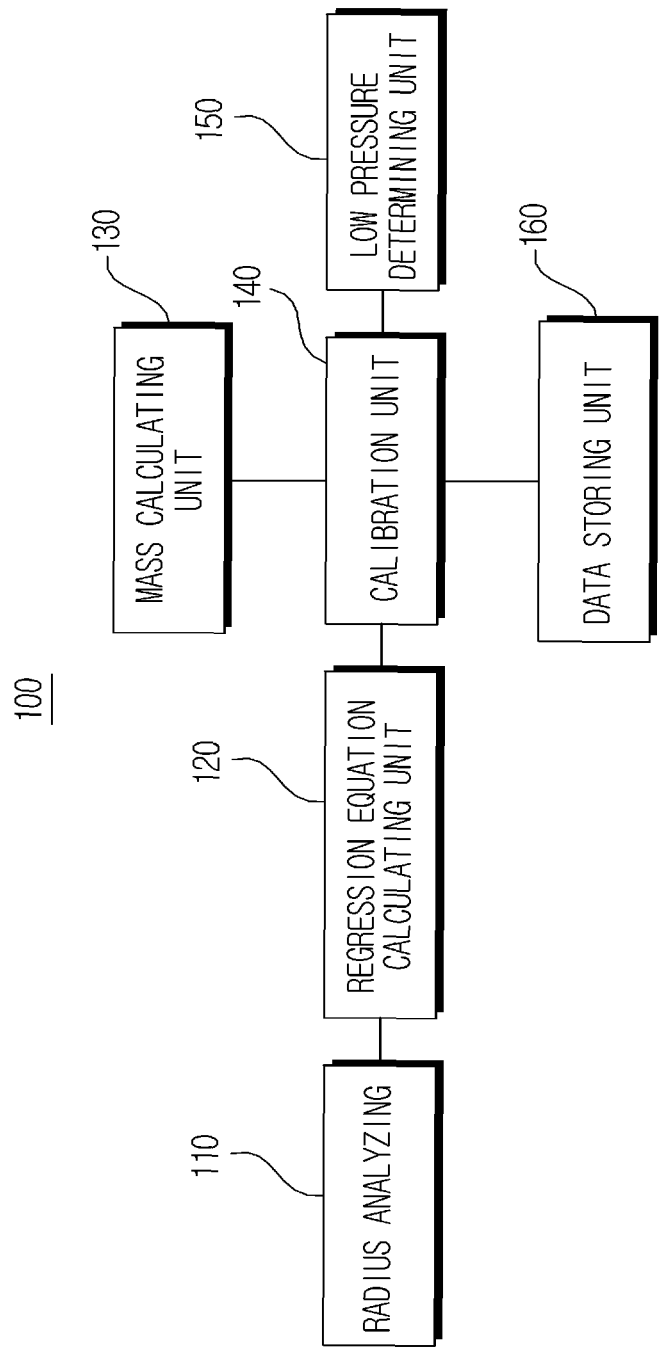
FIG. 1 is a configuration view of a tire pressure monitoring apparatus using radius analysis according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that unnecessary description is omitted to clearly transmit the gist of the present invention without obscuring the gist.

By the same reason, in the accompanying drawings, some parts are exaggerated, omitted, or schematically illustrated. Further, an actual size is not fully reflected to the size of each component. In the drawings, like reference numerals denote like or corresponding components.

FIG. 1 is a configuration view of a tire pressure monitoring apparatus using radius analysis according to an exemplary embodiment of the present invention.

As illustrated in FIG. 1, a tire pressure monitoring apparatus 100 according to an exemplary embodiment of the present invention includes a radius analyzing unit 110, a regression equation calculating unit 120, a mass calculating unit 130, a calibration unit 140, a low pressure determining unit 150, and a data storing unit 160.

Hereinafter, specific configuration and operation of components of a tire pressure monitoring apparatus 100 using radius analysis of FIG. 1 will be described.

First, the radius analyzing unit 110 receives a wheel velocity of a wheel from a wheel velocity sensor (not illustrated) provided in the vehicle. In the vehicle, four wheels including a front left wheel FL, a front right wheel FR, a rear left wheel RL, and a rear right wheel RR are mounted. The wheel velocity sensor detects rotation velocities of the front left wheel FL, the front right wheel FR, the rear left wheel RL, and the rear right wheel RR. For example, the wheel velocity sensor may be a wheel velocity sensor which generates a rotation pulse using an electromagnetic pickup and measures a rotational angular velocity and a wheel velocity from a pulse number. In the meantime, the wheel velocity sensor may be an angular velocity sensor. Information on the rotation velocity of the wheel measured by the wheel velocity sensor is transmitted to the radius analyzing unit 110.

The radius analyzing unit 110 calculates a radius analysis value using a relative velocity difference and an average velocity calculated from wheel velocities of the wheels mounted on the vehicle. Here, it is determined whether a pressure of the tire is reduced by comparing the rotation velocities of the wheels. Therefore, the radius analysis is performed by comparing the rotation velocities of the wheels by various methods. In this exemplary embodiment, the radius analysis value is calculated by the following method.

When it is assumed that wheel rotation velocities are $V_{\Phi A}$, $V_{\Phi P}$, $V_{PA}$, and $V_{PP}$ for the front left wheel FL, the front right wheel FR, the rear left wheel RL, and the rear right wheel RR, the average velocity $V_M$ of four wheels is calculated by the following Equation 1.

$$V_M = \frac{(V_{FL} + V_{FR} + V_{RL} + V_{RR})}{4} \quad \text{Equation 1}$$

Here, $V_{\Phi A}$, $V_{\Phi P}$, $V_{PA}$, and $V_{PP}$ represent wheel velocities of the front left wheel FL, the front right wheel FR, the rear left wheel RL, and the rear right wheel RR, respectively, and $V_M$ represents an average velocity of four wheels.

The radius analyzing unit 110 calculates the radius analysis values DEL_FR, DEL_LR, and DEL_DIAG, as represented in the following Equations 2 to 4, using the wheel velocities $V_{\Phi A}$, $V_{\Phi P}$, $V_{PA}$, and $V_{PP}$ of the front left wheel FL, the front right wheel FR, the rear left wheel RL, and the rear right wheel RR and the average velocity $V_M$ of four wheels.

$$DEL\_FR = \frac{\frac{V_{FL} + V_{FR}}{2} - \frac{V_{RL} + V_{RR}}{2}}{V_M} \quad \text{Equation 2}$$

Here, DEL_FR is a radius analysis value of the front and rear wheels, $V_{XX}$ is a wheel velocity of XX wheel, and $V_M$ is an average velocity of four wheels.

$$DEL\_LR = \frac{\frac{V_{FL} + V_{RL}}{2} - \frac{V_{FR} + V_{RR}}{2}}{V_M} \quad \text{Equation 3}$$

Here, DEL_LR is a radius analysis value of the left and right wheels, $V_{XX}$ is a wheel velocity of XX wheel, and $V_M$ is an average velocity of four wheels.

$$DEL\_DIAG = \frac{\frac{V_{FL} + V_{RR}}{2} - \frac{V_{FR} + V_{RL}}{2}}{V_M} \quad \text{Equation 4}$$

Here, DEL_DIAG is a radius analysis value of the wheels in a diagonal direction, $V_{XX}$ is a wheel velocity of XX wheel, and $V_M$ is an average velocity of four wheels.

The regression equation calculating unit 120 calculates a first regression equation for the radius analysis value calculated in the radius analyzing unit 110 and first driving information. Here, the first driving information may include a torque value for a driving situation when the vehicle is driven. The regression equation calculating unit 120 calculates a first regression equation for a front and rear radius analysis value DEL_FR calculated in the radius analyzing unit 110 and a torque.

The regression equation calculating unit 120 calculates a second regression equation for the radius analysis value calculated in the radius analyzing unit 110 and second driving information. Here, the second driving information may include a yaw rate value for a driving situation when the vehicle is driven. The regression equation calculating unit 120 calculates a second regression equation for a left and right radius analysis value DEL_LR calculated in the radius analyzing unit 110 and the yaw rate.

When a count value for every section of the torque input buffer included in the data storing unit 160 is equal to or larger than a predetermined value, the regression equation calculating unit 120 may calculate the first regression equation for the front and rear radius analysis value DEL_FR and the torque. Here, the count value for every section of the torque input buffer is counted whenever the torque value is sampled in the torque input buffer to be input in the data storing unit 160.

When a count value for every section of the yaw rate input buffer included in the data storing unit 160 is equal to or larger than a predetermined value, the regression equation calculating unit 120 may calculate the second regression equation for the left and right radius analysis value DEL_LR and the yaw rate. Here, the count value for every section of the yaw rate input buffer is counted whenever the yaw rate value is sampled in the yaw rate input buffer to be input in the data storing unit 160.

As another example, the regression equation calculating unit 120 may calculate the regression equation for the front left wheel FL, the front right wheel FR, the rear left wheel RL, and the rear right wheel RR by combining each radius analysis value DEL_FR, DEL_LR, or DEL_DIAG and driving information of the vehicle or status information of the vehicle.

The mass calculating unit 130 calculates an additional mass of the vehicle. The mass calculating unit 130 may calculate a currently added mass of the vehicle using a mass estimating logic as represented in the following Equation 5.

$$\text{Added Mass} = \text{Estimated Mass} - \text{Mass of Empty Vehicle} \quad \text{Equation 5}$$

As another example, the mass calculating unit 130 may calculate an added mass of the vehicle using a vehicle mass map stored in the data storing unit 160. The data storing unit 160 may store a wheel velocity difference map for every vehicle velocity in which a vehicle velocity is mapped to a wheel velocity difference between a front wheel and a rear wheel of the vehicle, in accordance with a vehicle tire characteristic. Further, the data storing unit 160 may store a mass map for every vehicle torque or every yaw rate in which the torque or the yaw rate and a wheel velocity difference are mapped to a vehicle mass. That is, the data storing unit 160 may store detailed information on driving information of the vehicle, in advance.

The calibration unit 140 corrects the radius analysis value calculated in the radius analyzing unit 110 using a combination of the first and second regression equations calculated in the regression equation calculating unit 120 and the additional mass of the vehicle calculated in the mass calculating unit 130.

The calibration unit 140 calculates the torque compensation value of the front and rear radius analysis value DEL_FR using a coefficient of the first regression equation calculated in the regression equation calculating unit 120 and the torque value of the vehicle. Further, the calibration unit 140 may calculate the mass compensation value of the front and rear radius analysis value DEL_FR using the added mass of the vehicle as represented in the following Equation 6.

$$\text{Mass Compensation Value of } DEL_{FR} = \frac{(\text{Added Mass} - \text{Least Mass})}{(\text{Maximum Mass} - \text{Minimum Mass})} \times \text{Coefficient} \quad \text{Equation 6}$$

In Accordance With Change of Mass

Here, DEL_FR indicates a radius analysis value of the front and rear wheels.

The calibration unit 140 may calculate a corrected value of the front and rear radius analysis value DEL_FR by subtracting a torque compensation value of the calculated front and rear radius analysis value DEL_FR and a mass compensation value of the calculated front and rear radius analysis value DEL_FR from the front and rear radius analysis value DEL_FR calculated in the radius analyzing unit 110, as represented in the following Equation 7.

Corrected value of DEL_FR=DEL_FR−Torque compensation value of DEL_FR−mass compensation value of DEL_FR  Equation 7

Here, DEL_FR indicates a radius analysis value of the front and rear wheels.

The calibration unit 140 calculates a yaw rate compensation value of the left and right radius analysis value DEL_LR using a coefficient of the second regression equation and the yaw rate. The calibration unit 140 may calculate a corrected value of the left and right radius analysis value DEL_LR by subtracting a yaw rate compensation value of the calculated left and right radius analysis value DEL_LR from the left and right radius analysis value DEL_LR calculated in the radius analyzing unit 110, as represented in the following Equation 8.

Corrected value of DEL_LR =DEL_LR−Yaw rate compensation value of DEL_LR  Equation 8

Here, DEL_LR indicates a radius analysis value of the left and right wheels.

The calibration unit 140 analyzes a correlation of the front and rear radius analysis value DEL_FR and an average torque of the vehicle and confirms how much the average torque of the vehicle affects the radius analysis value of the front and rear wheels when the vehicle is driven through the first regression equation. For example, when the correlation of the front and rear radius analysis value DEL_FR calculated in the radius analyzing unit 110 and the average torque of the vehicle exceeds a predetermined reference value, the calibration unit 140 may determine that the average torque of the vehicle highly affects the radius analysis value of the front and rear wheels.

The calibration unit 140 analyzes correlation of the left and right radius analysis value DEL_LR and the yaw rate of the vehicle and confirms how much the yaw rate of the vehicle affects the radius analysis value of the left and right wheels when the vehicle is driven through the second regression equation. As another example, when the correlation of the left and right radius analysis value DEL_LR calculated in the radius analyzing unit 110 and the yaw rate of the vehicle exceeds a predetermined reference value, the calibration unit 140 may determine that the yaw rate of the vehicle highly affects the radius analysis value of the left and right wheels.

The low pressure determining unit 150 determines the low pressure of the tire mounted on the vehicle using the radius analysis value corrected in the calibration unit 140. The corrected front and rear radius analysis value DEL_FR and left and right radius analysis value DEL_LR are used to determine the low pressure of the tire mounted on the vehicle. That is, the low pressure determining unit 150 may determine the low pressure of the tire using the corrected DEL_FR and DEL_LR in accordance with at least one combination of coefficients of the first and second regression equations calculated in the regression equation calculating unit 120, the torque of the vehicle, and the yaw rate.

In the meantime, the data storing unit 160 stores data for determining the low pressure of the tire mounted on the vehicle, stores data for calculating the first regression equation for the radius analysis value and the torque, and stores data for calculating the second regression equation for the radius analysis value and the yaw rate.

Here, the data storing unit 160 may include the torque input buffer and the yaw rate input buffer. The torque input buffer and the yaw rate input buffer are divided into predetermined sections. The torque value and the yaw rate value are divided by the predetermined sections to be input in the torque input buffer and the yaw rate input buffer, respectively. The torque value and the yaw rate value may have the minimum value or the maximum value of the torque and the yaw rate.

Figure 2:
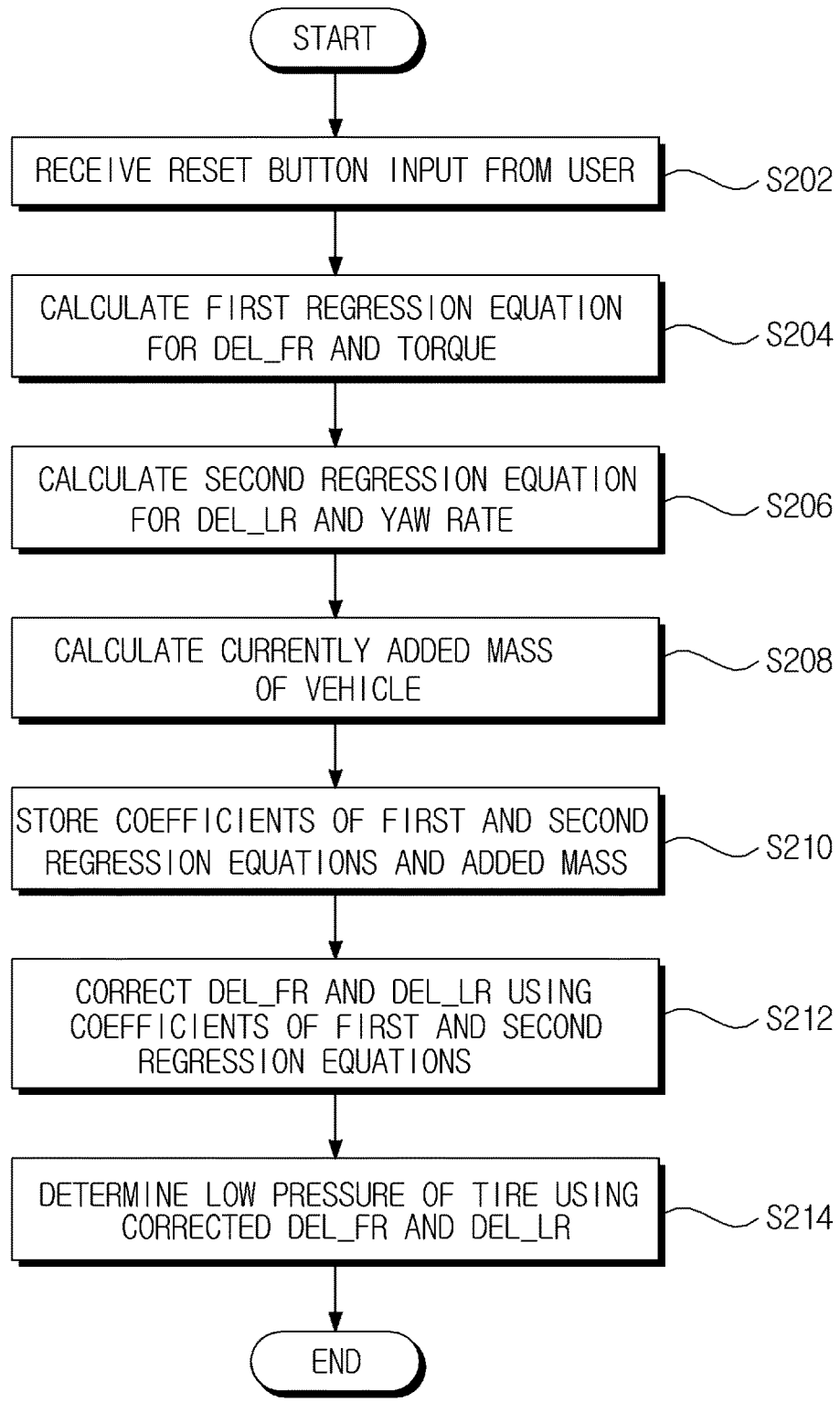
FIG. 2 is a flowchart of a tire pressure monitoring method using radius analysis according to an exemplary embodiment of the present invention.

FIG. 2 is a flowchart of a tire pressure monitoring method using radius analysis according to an exemplary embodiment of the present invention.

The tire pressure monitoring apparatus 100 receives a reset button for calibration of a tire pressure monitoring result from a user in step S202.

The regression equation calculating unit 120 calculates a first regression equation for a front and rear radius analysis value DEL_FR calculated in the radius analyzing unit 110 and a torque in step S204.

The regression equation calculating unit 120 calculates a second regression equation for a left and right radius analysis value DEL_LR calculated in the radius analyzing unit 110 and the yaw rate in step S206.

The mass calculating unit 130 calculates a currently added mass of the vehicle which is being driven in step S208. When the vehicle is not driven, the mass calculating unit 130 may calculate a mass which is added from an initial mass of the vehicle. The initial mass of the vehicle may be stored in the data storing unit 160 in advance or calculated in advance before driving the vehicle as an initial process of the mass calculating process.

The data storing unit 160 stores coefficients of the first and second regression equations calculated in the regression equation calculating unit 120 and the added mass of the vehicle calculated by the mass calculating unit 130 in step S210.

Next, the calibration unit 140 corrects the front and rear radius analysis value DEL_FR and the left and right radius analysis value DEL_LR using the coefficients of the first and second regression equations calculated in the regression equation calculating unit 120 in step S212. Here, the calibration unit 140 may correct the front and rear radius analysis value DEL_FR and the left and right radius analysis value DEL_LR using the coefficients of the first and second regression equations calculated in the regression equation calculating unit 120 and the added mass of the vehicle calculated by the mass calculating unit 130.

The low pressure determining unit 150 determines the low pressure of the tire using the front and rear radius analysis value DEL_FR and the left and right radius analysis value DEL_LR corrected in the calibration unit 140 in step S214.

Figure 3:
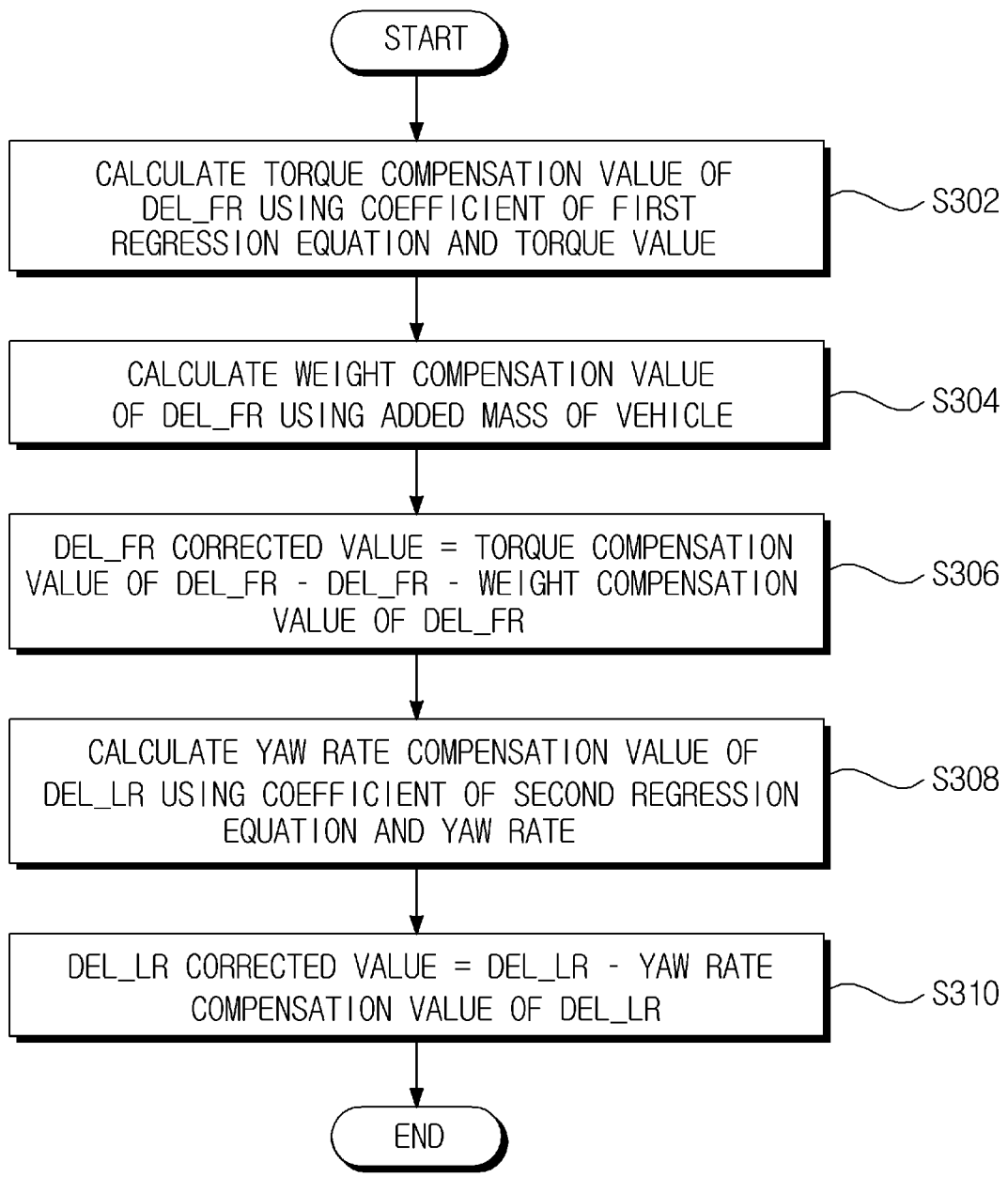
FIG. 3 is a detailed flow chart of a radius analysis value correcting step of FIG. 2 according to an exemplary embodiment of the present invention.

FIG. 3 is a detailed flow chart of a radius analysis value correcting step of FIG. 2 according to an exemplary embodiment of the present invention.

The calibration unit 140 calculates a torque compensation value of the front and rear radius analysis value DEL_FR using a coefficient of the calculated first regression equation and the torque value in step S302.

The calibration unit 140 calculates a mass compensation value of the front and rear radius analysis value DEL_FR using the added mass of the vehicle in step S304.

Next, the calibration unit 140 may calculate a corrected value of the front and rear radius analysis value DEL_FR by subtracting a torque compensation value of the calculated front and rear radius analysis value DEL_FR and a mass compensation value of the calculated front and rear radius analysis value DEL_FR from the front and rear radius analysis value DEL_FR calculated in the radius analyzing unit 110, as represented in the above Equation 7 in step S306.

The calibration unit 140 calculates a yaw rate compensation value of the left and right radius analysis value DEL_LR using a coefficient of the calculated second regression equation and the yaw rate in step S308.

The calibration unit 140 may calculate a corrected value of the left and right radius analysis value DEL_LR by subtracting a yaw rate compensation value of the calculated left and right radius analysis value DEL_LR from the left and right radius analysis value DEL_LR calculated in the radius analyzing unit 110, as represented in the above Equation 8 in step S310.

Figure 4:
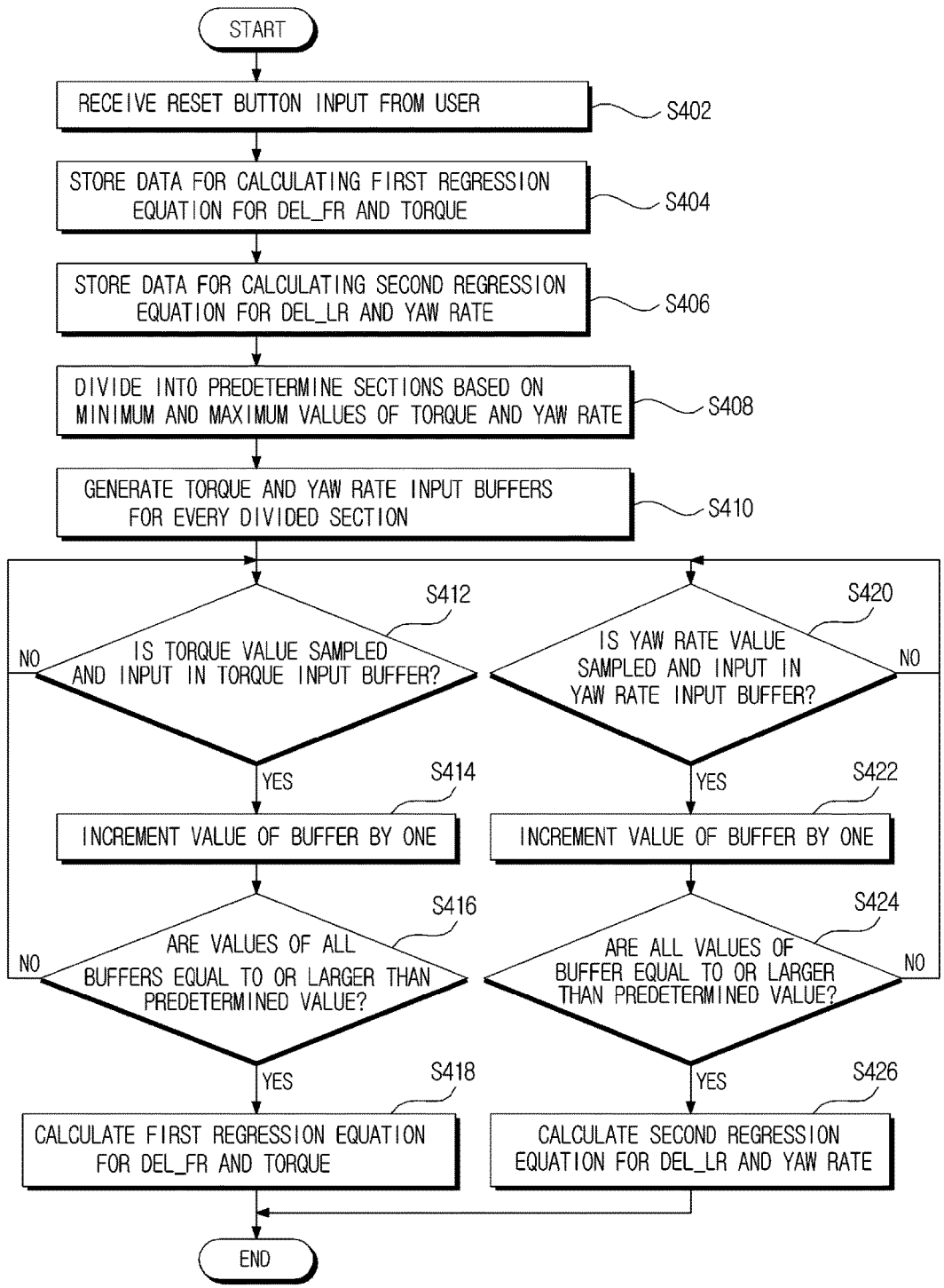
FIG. 4 is a flowchart of a process of verifying regression equation calculation required to correct a radius analysis value according to an exemplary embodiment of the present invention.

FIG. 4 is a flowchart of a process of verifying regression equation calculation required to correct a radius analysis value according to an exemplary embodiment of the present invention.

The tire pressure monitoring apparatus 100 receives a reset button for a process of verifying the regression equation calculation required to correct the radius analysis value from the user in step S402. Here, the reset button may be a reset button for correcting the radius analysis value.

The data storing unit 160 stores data for calculating a first regression equation for the front and rear radius analysis value DEL_FR and a torque in step S404.

The data storing unit 160 stores data for calculating a second regression equation for the left and right radius analysis value DEL_LR and a yaw rate in step S406.

The data storing unit 160 divides a data space in which data is stored into predetermined sections with respect to minimum and maximum values of the torque and the yaw rate in step S408.

Next, the data storing unit 160 generates a torque input buffer and a yaw rate input buffer which are divided for every section using the data space which is divided into predetermined sections in step S410.

In the meantime, the data storing unit 160 checks whether the torque value is sampled in the torque input buffer to be input in step S412.

As a result of checking in step S412, when the torque value is sampled in the torque input buffer to be input, the values of the buffer are increased by a predetermined value (for example, a unit value of the buffer or 1) in step S414. That is, the data storing unit 160 counts a count value for every section of the torque input buffer whenever the torque value is sampled in the torque input buffer to be input. In contrast, as a result of checking in step S412, when the torque value is not sampled in the torque input buffer to be input, the data storing unit 160 performs step S412 of monitoring whether the torque value is sampled in the torque input buffer to be input again.

Next, the data storing unit 160 checks whether all values (for example, count values) of the buffer are equal to or larger than a predetermined count value for every section in the torque input buffer in step S416.

As a result of checking in step S416, when all values of the buffer are equal to or larger than the predetermined count value for every section in the torque input buffer, the regression equation calculating unit 120 calculates a first regression equation for the front and rear radius analysis value DEL_FR and the torque in step S418.

In contrast, as a result of checking in step S416, when all values (for example, count values) of the buffer are smaller than the predetermined count value for every section in the torque input buffer, the data storing unit 160 performs steps from step S412 of monitoring whether the torque value is sampled in the torque input buffer to be input again.

In the meantime, the data storing unit 160 checks whether the yaw rate value is sampled in the yaw rate input buffer to be input in step S420.

As a result of checking in step S420, when the yaw rate value is sampled in the yaw rate input buffer to be input, the values of the buffer are increased by a predetermined value (for example, a unit value of the buffer or 1) in step S422. That is, the data storing unit 160 counts a count value for every section of the yaw rate input buffer whenever the yaw rate value is sampled in the yaw rate input buffer to be input. In contrast, as a result of checking in step S420, when the yaw rate value is not sampled in the yaw rate input buffer to be input, the data storing unit 160 performs step S420 of monitoring whether the yaw rate value is sampled in the yaw rate input buffer to be input again.

Next, the data storing unit 160 checks whether all values (for example, count values) of the buffer are equal to or larger than a predetermined count value for every section in the yaw rate input buffer in step S424.

As a result of checking in step S424, when all values of the buffer are equal to or larger than the predetermined count value for every section in the yaw rate input buffer, the regression equation calculating unit 120 calculates a first regression equation for the front and rear radius analysis value DEL_FR and the yaw rate in step S426.

In contrast, as a result of checking in step S424, when all values of the buffer are smaller than the predetermined count value for every section in the yaw rate input buffer, the data storing unit 160 performs steps from step S420 of monitoring whether the yaw rate value is sampled in the yaw rate input buffer to be input again.

Figure 5:
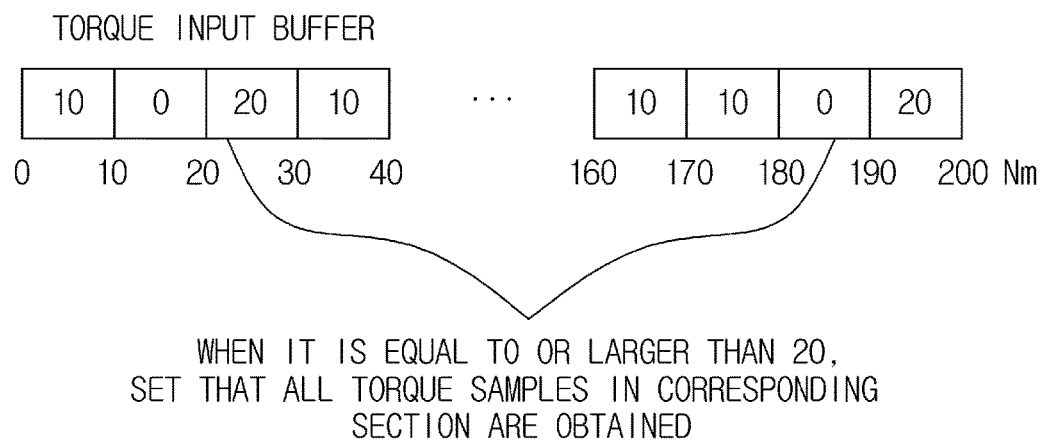
FIG. 5 is an explanatory view of a torque input buffer for a process of verifying regression equation calculation according to an exemplary embodiment of the present invention.

FIG. 5 is an explanatory view of a torque input buffer for a process of verifying regression equation calculation according to an exemplary embodiment of the present invention.

The data storing unit 160, as illustrated in FIG. 5, generates a torque input buffer and a yaw rate input buffer which are divided for every section using the data space which is divided into predetermined sections.

A process of verifying regression equation calculation using a torque input buffer when a minimum value and a maximum value of the torque have a torque range of 0 Nm to 200 Nm will be described as an example with reference to FIG. 5.

In the torque input buffer, a torque range of 0 Nm to 200 Nm is divided by a predetermined section (for example, 10 Nm). Here, the torque value is sampled to be input in a section corresponding to the torque value among sections divided by 10 Nm.

In this case, the data storing unit 160 checks a section to which the torque value is sampled and input among the sections divided by 10 Nm.

As known from an example illustrated in FIG. 5, the data storing unit 160 may confirm that a buffer value for a section of 0 Nm to 10 Nm is 10 counts, a buffer value for a section of 10 Nm to 20 Nm is 0 count, a buffer value for a section of 20 Nm to 30 Nm is 20 counts, a buffer value for a section of 30 Nm to 40 Nm is 10 counts, . . . , a buffer value for a section of 160 Nm to 170 Nm is 10 counts, a buffer value for a section of 170 Nm to 180 Nm is 10 counts, a buffer value for a section of 180 Nm to 190 Nm is 0 count, and a buffer value for a section of 190 Nm to 200 Nm is 20 counts.

In this case, when the predetermined count value is 20, if the buffer value exceeds 20 counts, the regression equation calculating unit 120 may set that all torque samples are obtained in the corresponding section, in the data storing unit 160.

The data storing unit 160 checks whether all values (for example, count values) of the buffer for every section are equal to or larger than the predetermined count value, 20, in the torque input buffer and transmits the count value to the regression equation calculating unit 120.

When all values of the buffer are equal to or larger than the predetermined count value for every section in the torque input buffer, the regression equation calculating unit 120 calculates a first regression equation for the front and rear radius analysis value DEL_FR and the torque.

When all values of the buffer are smaller than the predetermined count value for every section in the torque input buffer, the data storing unit 160 may monitor whether the torque value is sampled to be input only in a section where the count value is zero or 10, excluding a section where the count value is equal to or larger than 20, in the entire torque range.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A tire pressure monitoring apparatus using radius analysis, the apparatus configured to determine
  a radius analysis value based on a relative speed difference and an average speed of wheel speeds of each wheel mounted on the vehicle,
  to calculate a first regression equation for the radius analysis value and first driving information and a second regression equation for the radius analysis value and second driving information,
  to measure an additional mass of the vehicle,
  to adjust the radius analysis value using a combination of the first and second regression equations and the additional mass, and to determine a low pressure of a tire mounted on the vehicle using the adjusted radius analysis value, wherein the tire pressure monitoring apparatus calculates the first regression equation for a front and rear radius analysis value and a torque and the second regression equation for a left and right radius analysis value and a yaw rate, wherein the tire pressure monitoring apparatus calculates a torque compensation value of the front and rear radius analysis value using a coefficient of the first regression equation and the torque value, calculates a mass compensation value of the front and rear radius analysis value using an added mass of the vehicle, and calculates a corrected front and rear radius analysis value by subtracting the torque compensation value of the front and rear radius analysis value and the mass compensation value of the front and rear radius analysis value from the front and rear radius analysis value, wherein the tire pressure monitoring apparatus is included in a Tire Pressure Monitoring System (TPMS), wherein the TPMS measures and outputs air pressure of the tire based on the adjusted radius analysis value.

2. The apparatus according to claim 1,
wherein the tire pressure monitoring apparatus stores data for determining the low pressure of the tire mounted on the vehicle, stores data for calculating the first regression equation for the radius analysis value and the torque, and stores data for calculating the second regression equation for the radius analysis value and the yaw rate.

3. The apparatus according to claim 2, wherein the tire pressure monitoring apparatus includes torque and yaw rate input buffers which are divided by predetermined sections and in which a torque value and a yaw rate value having a minimum value and a maximum value of the torque and the yaw rate are divided by a predetermined section input.

4. The apparatus according to claim 3, wherein the tire pressure monitoring apparatus further calculates the first regression equation for the front and rear radius analysis value and the torque, when the torque value is counted in the data storing unit whenever the torque value is sampled in the torque input buffer to be input and the count value for every section of the torque input buffer is equal to or larger than a predetermined value.

5. The apparatus according to claim 3, wherein the tire pressure monitoring apparatus further calculates the second regression equation for the left and right radius analysis value and the yaw rate, when the yaw rate value is counted in the data storing unit whenever the yaw rate value is sampled in the yaw rate input buffer to be input and the count value for every section of the yaw rate input buffer is equal to or larger than a predetermined value.

6. The apparatus according to claim 1, wherein the tire pressure monitoring apparatus further calculates a yaw rate compensation value of the left and right radius analysis value using a coefficient of the second regression equation and the yaw rate and calculates a corrected left and right radius analysis value by subtracting the yaw rate compensation value of the left and right radius analysis value from the left and right radius analysis value.

7. The apparatus according to claim 1, wherein the tire pressure monitoring apparatus further determines the low pressure of the tire using the front and rear radius analysis value and the corrected left and right radius analysis value in accordance with at least one combination of coefficients, the torque, and the yaw rate of the calculated first and second regression equations.

8. A tire pressure monitoring method using radius analysis, the method comprising:
determining a radius analysis value, by a tire pressure monitoring apparatus, using a relative speed difference and an average speed calculated from wheel speeds of each wheel mounted on the vehicle;
calculating a first regression equation for the radius analysis value and first driving information and a second regression equation for the radius analysis value and second driving information;
measuring an additional mass of the vehicle;
adjusting the radius analysis value using a combination of the first and second regression equations and the additional mass;
determining a low pressure of a tire mounted on the vehicle using the adjusted radius analysis value,
wherein the first regression equation for a front and rear radius analysis value and the torque is calculated and the second regression equation for a left and right radius analysis value and the yaw rate is calculated,
wherein a torque compensation value of the front and rear radius analysis value is calculated using a coefficient of the calculated first regression equation and the calculated torque value, a mass compensation value of the front and rear radius analysis value is calculated using an added mass of the vehicle, and a corrected front and rear radius analysis value is calculated by subtracting the torque compensation value of the front and rear radius analysis value and the mass compensation value of the front and rear radius analysis value from the front and rear radius analysis value, and
applying the adjusted radius analysis value to a Tire Pressure Monitoring System (TPMS) and measuring and outputting air pressure of the tire.

9. The method according to claim 8, further comprising:
storing data for determining the low pressure of the tire mounted on the vehicle,
storing data for calculating the first regression equation for the radius analysis value and the torque, and
storing data for calculating the second regression equation for the radius analysis value and the yaw rate.

10. The method according to claim 9, wherein a torque value and a yaw rate value having a minimum value and a maximum value of the torque and the yaw rate are input in torque and yaw rate input buffers which are divided by a predetermined section.

11. The method according to claim 10, wherein the torque value is counted whenever the torque value is sampled in the torque input buffer to be input and when the count value for every section of the torque input buffer is equal to or larger than a predetermined value, the first regression equation for the front and rear radius analysis value and the torque is calculated.

12. The method according to claim 10, wherein the yaw rate value is counted whenever the yaw rate value is sampled in the yaw rate input buffer to be input and when the count value for every section of the yaw input buffer is equal to or larger than the predetermined value, the second regression equation for the left and right radius analysis value and the yaw rate is calculated.

13. The method according to claim 8, wherein a yaw rate compensation value of the left and right radius analysis value is calculated using a coefficient of the second regression equation and the yaw rate and a corrected left and right radius analysis value is calculated by subtracting the yaw rate compensation value of the left and right radius analysis value from the left and right radius analysis value.

14. The method according to claim 8, wherein the low pressure of the tire is determined using the adjusted front and rear radius analysis values and left and right radius analysis values among radius analysis values.

* * * * *